(12) United States Patent
Kaabouch et al.

(10) Patent No.: US 7,647,486 B2
(45) Date of Patent: Jan. 12, 2010

(54) METHOD AND SYSTEM HAVING INSTRUCTIONS WITH DIFFERENT EXECUTION TIMES IN DIFFERENT MODES, INCLUDING A SELECTED EXECUTION TIME DIFFERENT FROM DEFAULT EXECUTION TIMES IN A FIRST MODE AND A RANDOM EXECUTION TIME IN A SECOND MODE

(75) Inventors: Majid Kaabouch, Rousset (FR); Eric Le Cocquen, Beaume (FR)

(73) Assignee: Atmel Corporation, San Jose, CA (US)

( * ) Notice: Subject to any disclaimer, the term of this patent is extended or adjusted under 35 U.S.C. 154(b) by 44 days.

(21) Appl. No.: 11/416,651

(22) Filed: May 2, 2006

(65) Prior Publication Data

US 2007/0260861 A1 Nov. 8, 2007

(51) Int. Cl.
*G06F 9/00* (2006.01)
(52) U.S. Cl. ................................ 712/229; 712/226
(58) Field of Classification Search .................. 712/43, 712/200, 226, 229, 233, 234; 726/22, 34; 713/300, 320, 500
See application file for complete search history.

(56) References Cited

U.S. PATENT DOCUMENTS

| | | | | |
|---|---|---|---|---|
| 4,558,176 A * | 12/1985 | Arnold et al. | ................ | 713/190 |
| 5,034,880 A | 7/1991 | Fong et al. | ................ | 364/200 |
| 5,321,820 A | 6/1994 | Nakajima | ................ | 395/375 |
| 5,381,532 A | 1/1995 | Suzuki | ................ | 395/375 |
| 5,421,026 A | 5/1995 | Sato et al. | ................ | 395/800 |
| 5,426,742 A | 6/1995 | Kawasaki et al. | ........... | 395/375 |
| 5,928,358 A | 7/1999 | Takayama et al. | ........... | 712/239 |
| 5,944,833 A | 8/1999 | Ugon | | |
| 6,092,181 A | 7/2000 | Nguyen et al. | ............. | 712/206 |
| 6,230,261 B1 | 5/2001 | Henry et al. | ................ | 712/240 |
| 6,575,373 B1 * | 6/2003 | Nakano | ....................... | 235/492 |
| 6,598,152 B1 | 7/2003 | Sinharoy | ..................... | 712/228 |
| 6,662,121 B1 | 12/2003 | Yamaura | ..................... | 712/234 |

(Continued)

OTHER PUBLICATIONS

Cohen, "Operating System Protection Through Program Evolution," 1993, pp. 565-584.*

(Continued)

*Primary Examiner*—David J Huisman
(74) *Attorney, Agent, or Firm*—Schwegman, Lundberg & Woessner, P.A.

(57) ABSTRACT

A method and system for controlling timing in a processor is disclosed. In one aspect of the present invention, the method comprises fetching a plurality of instructions, wherein each instruction has a first default execution time during a first condition, and wherein each instruction has a second default execution time during a second condition; during a first mode, executing the plurality of instructions within a same execution time regardless of whether a condition is the first condition or the second condition; and during a second mode, executing the plurality of instructions within random execution time regardless of whether a condition is the first condition or the second condition. According to the system and method disclosed herein, the method effectively modifies the timing of a processor by controlling and/or minimizing variations in the execution times of instructions.

43 Claims, 7 Drawing Sheets

U.S. PATENT DOCUMENTS

| | | | |
|---|---|---|---|
| 6,915,412 B2 | 7/2005 | Nguyen et al. | 712/23 |
| 7,155,626 B2* | 12/2006 | Aikawa | 713/400 |
| 2001/0054137 A1 | 12/2001 | Eickemeyer et al. | 712/11 |
| 2002/0016903 A1 | 2/2002 | Nguyen et al. | 712/23 |
| 2003/0079113 A1 | 4/2003 | Nguyen et al. | 712/205 |
| 2003/0115478 A1* | 6/2003 | Feyt | 713/194 |
| 2003/0149865 A1 | 8/2003 | Kadambi | 712/244 |
| 2005/0271202 A1* | 12/2005 | Shu et al. | 380/29 |
| 2006/0223452 A1* | 10/2006 | Nunokawa et al. | 455/73 |

OTHER PUBLICATIONS

Atmel, "8-bit AVR Microcontroller with 1K Byte of In-System Programmable Flash", Mar. 2002, 71 pages.*

Atmel, "AVR Instruction Set", Jun. 1999, 133 pages.*

Puschner et al., "Avoiding Timing Problems in Real-Time Software", Proceedings of the IEEE Workshop on Software Technologies for Future Embedded Systems, May 2003.

* cited by examiner

|  | 3Bit Variable Value | Timing |
|---|---|---|
| SBIS No Skip | 0 | 4 |
| RJMP |  | 2 |
| SBIS No Skip | 7 | 11 |
| RJMP |  | 2 |
| SBIS No Skip | 4 | 8 |
| RJMP |  | 2 |
| SBIS No Skip | 2 | 6 |
| RJMP |  | 2 |
| SBIS No Skip | 5 | 9 |
| RJMP |  | 2 |
| SBIS No Skip | 1 | 5 |
| RJMP |  | 2 |
| SBIS No Skip | 3 | 7 |
| RJMP |  | 2 |
| SBIS No Skip | 4 | 8 |
| LDI |  |  |
| .... |  |  |

6 cycles
18 cycles
12 cycles
8 cycles
14 cycles
6 cycles
10 cycles

FIG.8

| Mnemonics | | Default Timing exec | Balanced Timing exec |
|---|---|---|---|
| | CONDITIONAL BRANCH | | |
| BRBS | Branch if Status flag is Set | 1/2 | 3 |
| BRBC | Branch if Status flag is Cleared | 1/2 | 3 |
| BREQ | Branch if Equal | 1/2 | 3 |
| BRNE | Branch if Not Equal | 1/2 | 3 |
| BRCS | Branch if Carry Set | 1/2 | 3 |
| BRCC | Branch if Carry Cleared | 1/2 | 3 |
| BRSH | Branch if Same or Higher | 1/2 | 3 |
| BRLO | Branch if Lower | 1/2 | 3 |
| BRMI | Branch if Minus | 1/2 | 3 |
| BRPL | Branch if Plus | 1/2 | 3 |
| BRGE | Branch if Greater or Equal, Signed | 1/2 | 3 |
| BRLT | Branch if Less Than, Signed | 1/2 | 3 |
| BRHS | Branch if Half Carry Flag Set | 1/2 | 3 |
| BRHC | Branch if Half Carry Flag Cleared | 1/2 | 3 |
| BRTS | Branch if T Flag Set | 1/2 | 3 |
| BRTC | Branch if T Flag Cleared | 1/2 | 3 |
| BRVS | Branch if Overflow Flag is Set | 1/2 | 3 |
| BRVC | Branch if Overflow Flag is Cleared | 1/2 | 3 |
| BRIE | Branch if Interrupt Enabled | 1/2 | 3 |
| BRID | Branch if Interrupt Disabled | 1/2 | 3 |
| | SKIP INSTRUCTIONS | | |
| SBRC | Skip if Bit in Register Cleared | 1/2/3 | 4 |
| SBRS | Skip if Bit in Register Set | 1/2/3 | 4 |
| SBIC | Skip if Bit in I/O Register Cleared | 1/2/3 | 4 |
| SBIS | Skip if Bit in I/O Register Set | 1/2/3 | 4 |
| CPSE | Compare, Skip if Equal | 1/2/3 | 4 |

FIG. 9

METHOD AND SYSTEM HAVING INSTRUCTIONS WITH DIFFERENT EXECUTION TIMES IN DIFFERENT MODES, INCLUDING A SELECTED EXECUTION TIME DIFFERENT FROM DEFAULT EXECUTION TIMES IN A FIRST MODE AND A RANDOM EXECUTION TIME IN A SECOND MODE

FIELD OF THE INVENTION

The present invention relates to computer systems, and more particularly to a method and system for controlling timing in a processor.

BACKGROUND OF THE INVENTION

A central processing unit (CPU) is the part of a computer that interprets and carries out instructions contained in software, which can have various functions such as controlling hardware, performing computations, and communication with other software. The timing execution of instructions may vary, depending on a number of various conditions (e.g., status register contents, the value of a bit, the size of the following instructions, accessed peripherals, etc.).

Variations in timing execution can be a serious problem when the timing must be constant or predictable. For example, during software communication routines, a co-processor must be synchronized with the CPU. Timing variations can also cause problems such as the leakage of sensitive information, etc.

Generally, known solutions are unreliable and time consuming to implement. For example, software routines are developed and manually balanced in Assembly Language to ensure that all possible paths execute in an equal number of clock cycles. This is an error prone and time-consuming process that also induces high maintenance costs and risks.

Accordingly, what is needed is an improved method and system for controlling timing in a CPU. The present invention addresses such a need.

SUMMARY OF THE INVENTION

A method and system for controlling timing in a processor is disclosed. In one aspect of the present invention, the method comprises fetching a plurality of instructions, wherein each instruction has a first default execution time during a first condition, and wherein each instruction has a second default execution time during a second condition; during a first mode, executing the plurality of instructions within a same execution time regardless of whether a condition is the first condition or the second condition; and during a second mode, executing the plurality of instructions within random execution times regardless of whether a condition is the first condition or the second condition. According to the system and method disclosed herein, the method effectively modifies the timing of a processor by controlling and/or minimizing variations in the execution times of instructions.

DETAILED DESCRIPTION OF THE INVENTION

The present invention relates to computer systems, and more particularly to a method and system for controlling timing in a processor. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for controlling timing in a processor are disclosed. The method includes controlling the execution times in which a processor executes particular types of instructions in order to improve the overall security of the processor. According to the system and method disclosed herein, the method effectively modifies the timing of a processor by controlling and/or minimizing variations in the execution times of instructions. During a timing compensation mode, instructions are executed within a same execution time regardless of whether a condition is true or false. During a controlled compensation mode, instructions are executed within random execution times regardless of whether a condition true or false. To more particularly describe the features of the present invention, refer now to the following description in conjunction with the accompanying figures.

Although the present invention disclosed herein is described in the context of CPUs, branch instructions, and skip instructions, the present invention may apply to other types of processors and other types of instructions, and still remain within the spirit and scope of the present invention.

Figure 1:
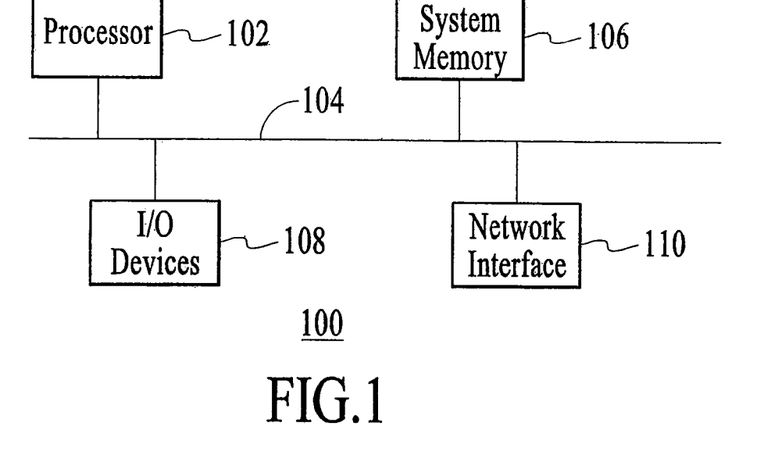
FIG. 1 is a block diagram of a conventional computer system.
Figure 2:
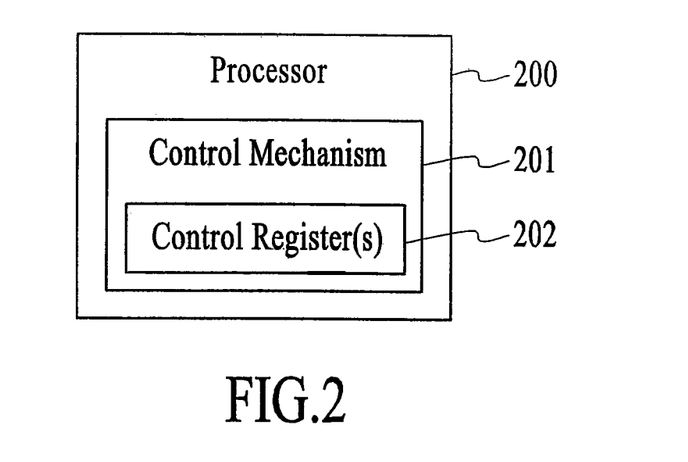
FIG. 2 is a block diagram of a processor, which may be used to implement the processor of FIG. 1, in accordance with the present invention.
Figure 3:
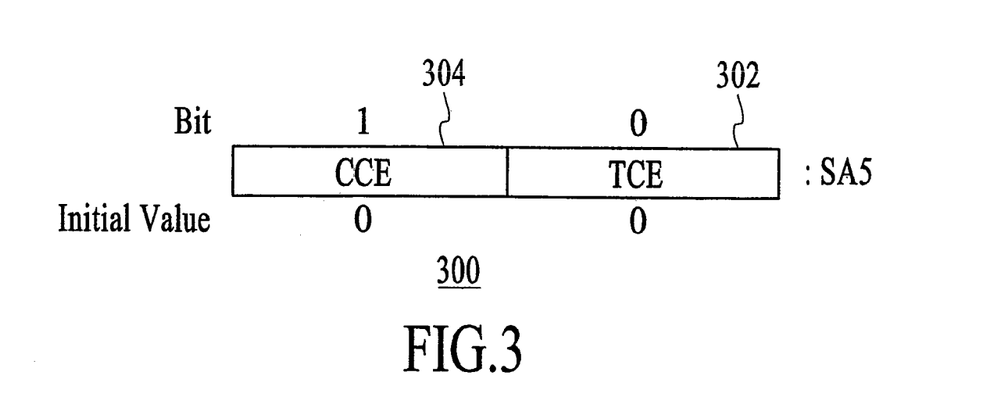
FIG. 3 is a diagram illustrating a control register, which may be used to implement the one or more control registers of FIG. 2, in accordance with the present invention.

FIG. 1 is a block diagram of a conventional computer system. The computer system 100 includes a processor 102, a bus 104, system memory 106 (e.g., hard drive, random access memory (RAM)), I/O devices 108 (e.g., keyboard, display, mouse, etc.), and a network interface 110 for connecting to a network such as a local area network (LAN) or the Internet. FIG. 2 is a block diagram of a processor 200, which may be used to implement the processor 102 of FIG. 1, in accordance with the present invention. The processor 200 includes a control mechanism 201, which has one or more control registers 202. FIG. 3 is a diagram illustrating a control register 300, which may be used to implement the one or more control registers 202 of FIG. 2, in accordance with the present invention. The control register 300 includes two bits 302 and 304. The operation of the control register 300 is described in further detail below.

Figure 9:
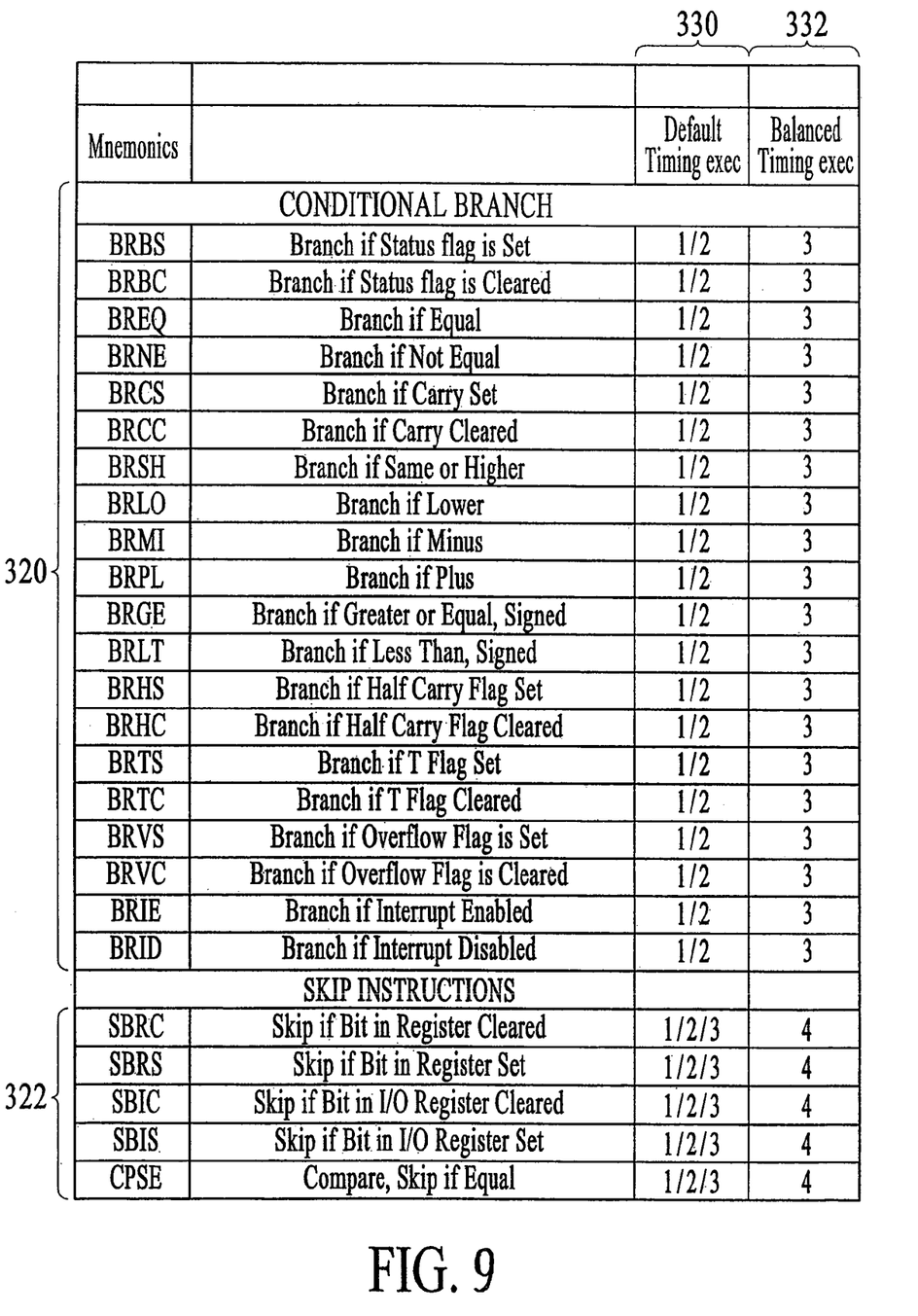
FIG. 9 shows a list of various types of branch instructions and skip instructions in accordance with an embodiment of the invention.

Timing compensation, in accordance with the present invention, refers to a process that provides constant execution timing of instructions. In one implementation, timing compensation is applied to the branch and skip instructions, but may apply to other types of instructions. FIG. 9 shows a list of various types of branch instructions 320 and skip instructions 322. The timing execution of branch and skip instructions typically varies, because the number of cycles required to execute a given instruction varies. A conditional branch or conditional skip instruction executes in a different number of cycles depending on the condition being true or false. For example, as shown in column 330 of FIG. 9, the default timing execution for a branch instruction may range from one to two cycles, and the default timing execution for a skip instruction may range from one to three cycles. In accordance with the present invention, a control mechanism 201 varies the number of cycles it takes to execute particular instructions. During timing compensation, the execution time is the same regardless of the condition. During controlled compensation, the execution time is random regardless of the condition, which prevents leakage of information. The control mechanism 201 is a digital block that compensates or controls (randomizes) the number of cycles taken by a conditional instruction to execute.

The equalization or randomization may be performed automatically by software, which is advantageous over manual operations, since manual operations are prone to error, time consuming, have high-maintenance costs, and are not compatible with high-level languages such as C. The control mechanism 201 improves execution timing, especially in time-sensitive applications, by minimizing the variations in execution times of different types of instructions as well as variations in power signatures. For example, as shown in column 332 of FIG. 9, the balanced timing execution (i.e., with timing compensated) for a branch instruction is set to three cycles, and the balanced timing execution for a skip instruction is set to four cycles. The specific number of cycles for branch and skip instructions will depend on the specific implementation.

Referring again to FIG. 3, in one embodiment, when the bit 302 (also labeled "Bit 0-TCE" (timing compensation enable)) is set by software, the timing compensation feature is enabled and all branch and skip instruction timing executions will take three cycles for branch instructions and four cycles for skip instructions. Of course the specific number cycles will depend on the specific implementation. When the bit 302 is cleared, all branches and skip instructions will follow the default timing execution.

In one embodiment, when the bit 304 (also labeled "Bit 1-CCE" (controlled compensation enable)) is set by software and the TCE bit is also set, the controlled compensation mechanism is enabled. When this bit is cleared, the controlled compensation mechanism is disabled. In a preferred embodiment, any attempt to set this bit when TCE is cleared has no effect. In one embodiment, the bit 302 is the "master switch" whereas the bit 304 is an "option selector." The bit 302 is used to switch the compensation ON, and the bit 304 selects whether balancing or randomization is selected. In an alternative embodiment, one of the two options may be offered. For example, a single bit may switch ON/OFF one type of compensation (e.g., timing compensation).

Figure 4:
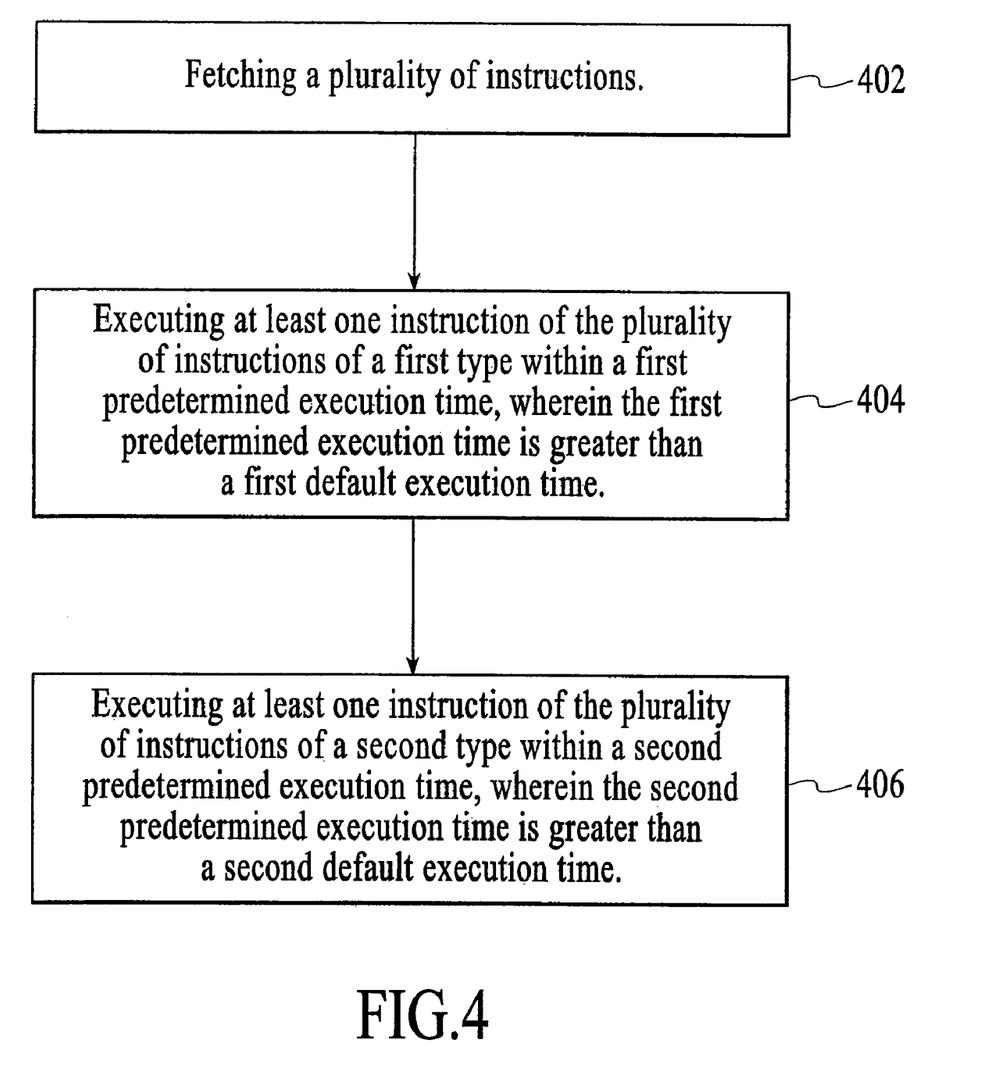
FIG. 4 is a flow chart showing a method for controlling timing in a processor, in accordance with the present invention.

FIG. 4 is a flow chart showing a method for controlling timing in a processor, in accordance with the present invention. Referring to both FIGS. 2 and 4, the process begins a step 402 when the processor 200 fetches a plurality of instructions. Each instruction has a first default execution time during a first condition (e.g., true), and each instruction has a second default execution time during a second condition (e.g., false). In one embodiment, the instructions may include different types of instructions (e.g., branch instructions and skip instructions). Next, in a step 404, during a first mode (i.e., timing compensation), the processor 200 executes the plurality of instructions within a same execution time regardless of whether a condition is the first condition or the second condition. Alternatively, in a step 406, during a second mode (i.e., controlled compensation), the processor 200 executes the plurality of instructions within random execution times regardless of whether a condition is the first condition or the second condition.

During timing compensation, the processor 200 executes at least one instruction of the plurality of instructions of a first type within a first predetermined execution time, wherein the first predetermined execution time is greater than a first default execution time. The processor 200 executes at least one instruction of the plurality of instructions of a second type within a second predetermined execution time, wherein the second predetermined execution time is greater than a second default execution time. In one embodiment, the first and second predetermined execution times are different. In another embodiment, the first and second predetermined execution times are the same. The first and second execution times are based on a number of cycles required to execute a given type of instruction. In this specific embodiment, the first predetermined execution time is greater than the first default execution time, and the second predetermined execution time is greater than the second default execution time. This enables the execution times of instructions of a given type of instruction to be the same. The specific type of instruction will depend on the specific implementation. For example, the first and second types of instruction can be conditional branch and skip instructions, respectively. Or, the first and second types of instruction can be skip and conditional branch instructions, respectively.

Figure 5:
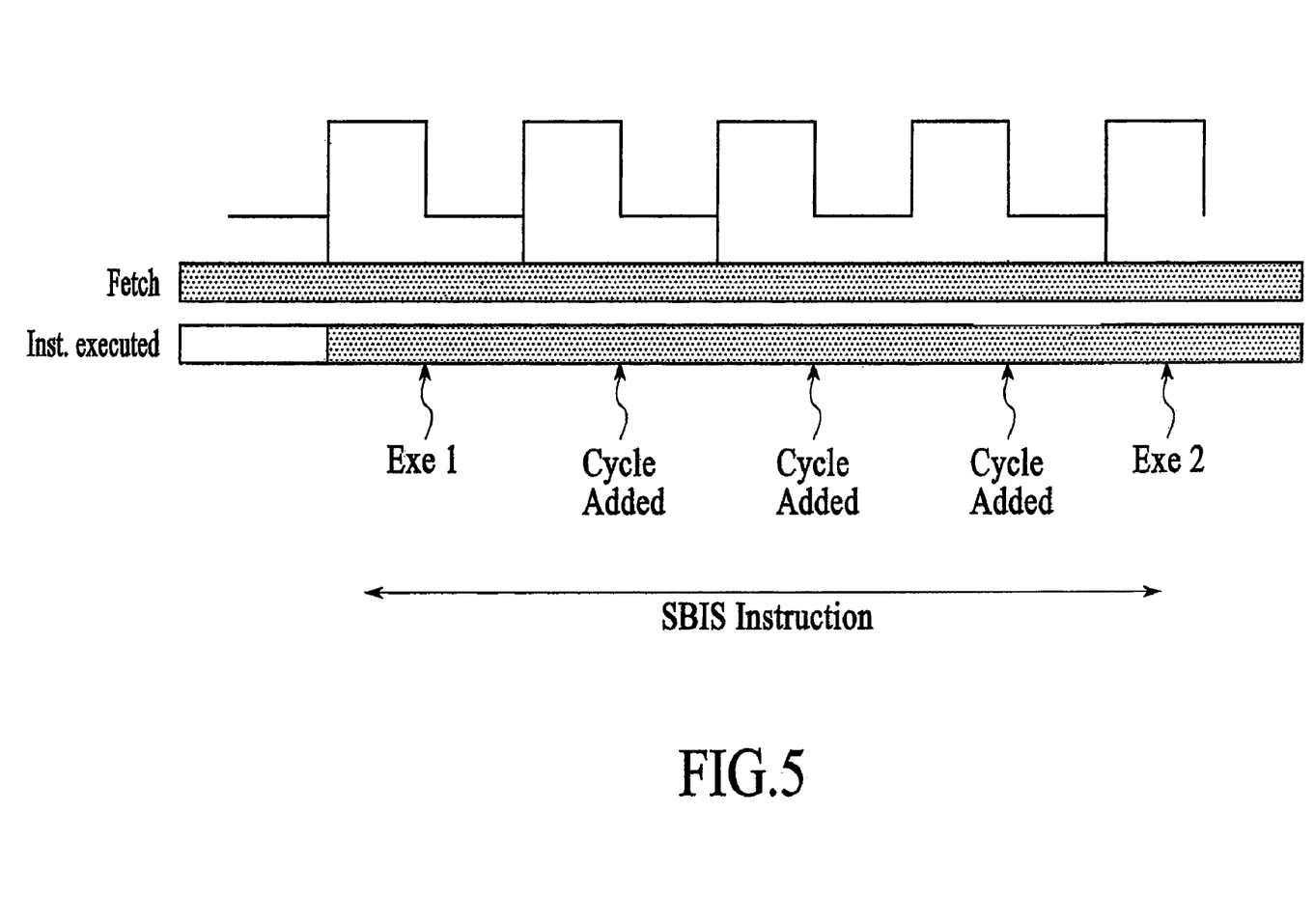
FIG. 5 is a timing diagram illustrating a skip instruction having a false condition (i.e., no skip), and where timing compensation is enabled in accordance with the present invention.

FIG. 5 is a timing diagram illustrating a skip instruction having a false condition (i.e., no skip), and where timing compensation is enabled in accordance with the present invention. As shown in FIG. 5, the default number of cycles required to execute this particular type of skip instruction is one cycle. After the processor 200 (FIG. 2) fetches the skip instruction, the control mechanism 201 adds three cycles in order to increase the number of cycles required to execute the skip instruction from one cycle to four cycles. The specific number of cycles added will depend on the specific implementation.

Figure 6:
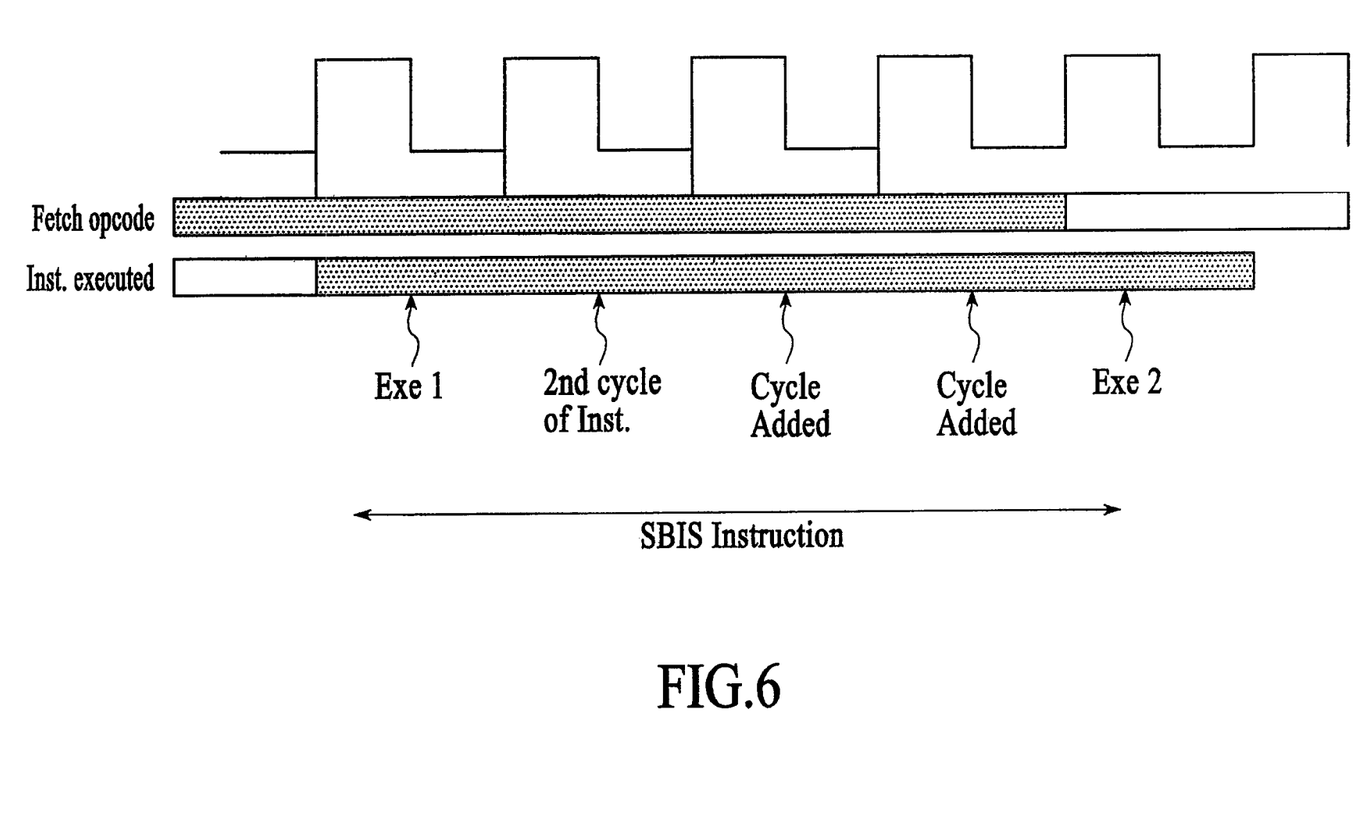
FIG. 6 is a timing diagram illustrating a skip instruction having a true condition (i.e., skip), and where timing compensation is enabled in accordance with the present invention.

FIG. 6 is a timing diagram illustrating a skip instruction having a true condition (i.e., skip), and where timing compensation is enabled in accordance with the present invention. As shown in FIG. 5, the default number of cycles required to execute this particular type of skip instruction is two cycles. After the processor fetches the skip instruction, the control mechanism 201 adds two cycles to increase the number of cycles required to execute the skip instruction from two cycles to four cycles. FIGS. 5 and 6 may also be applied to branch instructions or any other type of instructions. The key point is that the control mechanism 201 adds cycles if necessary so that the number of cycles required to execute a given type of instruction is controlled or the variations in execution timing are eliminated.

Figure 7:
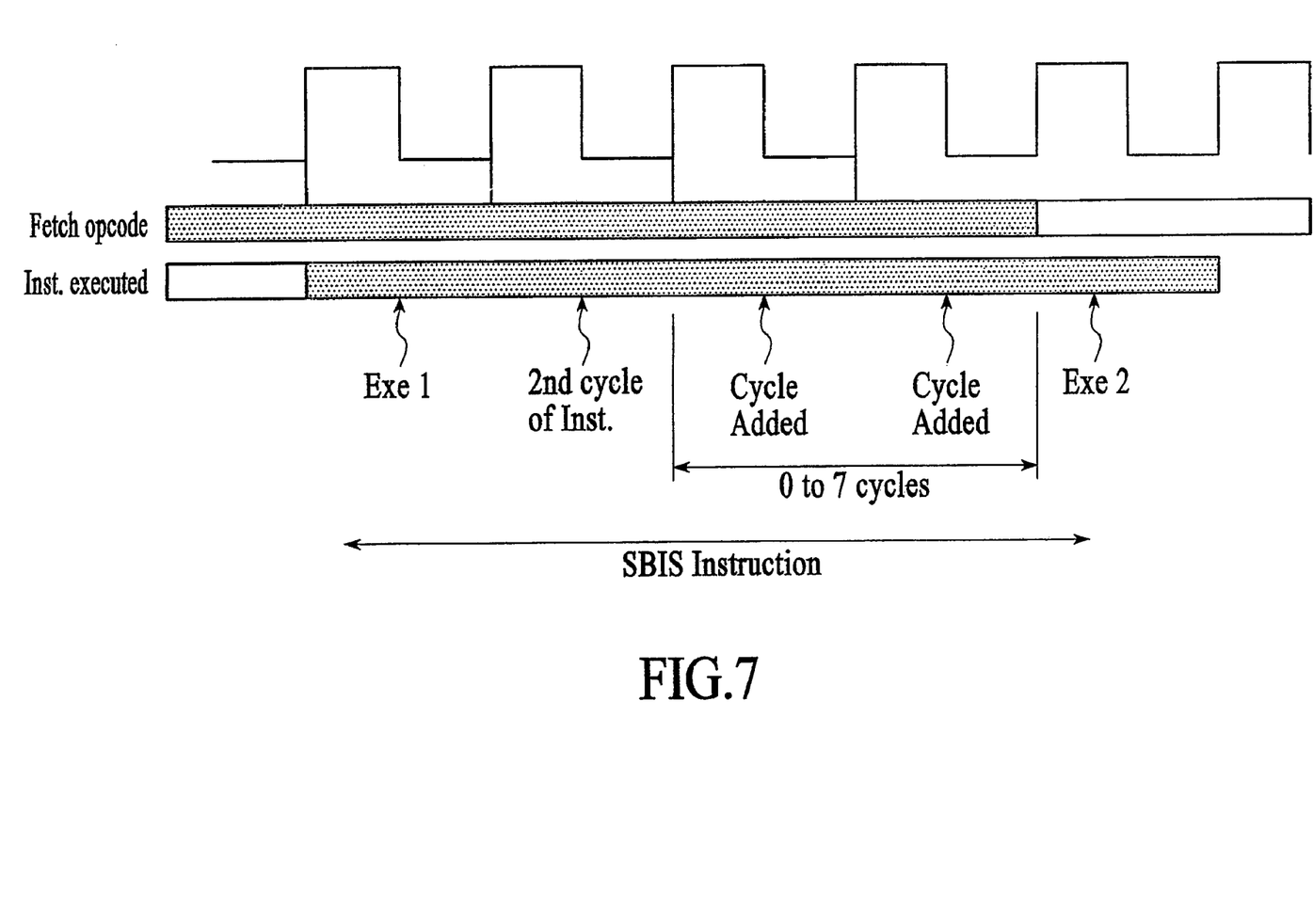
FIG. 7 is a timing diagram illustrating an instruction having controlled compensation in accordance with another embodiment of the present invention.

Controlled compensation, in accordance with the present invention, refers to a process that provides random execution timing of instructions. FIG. 7 is a timing diagram illustrating an instruction having controlled compensation in accordance with another embodiment of the present invention. In a preferred embodiment, a 3-bit variable value controls the number of cycles taken by the process to execute a given type of instruction such as a skip instruction. Accordingly, 0 to 7 cycles or more, may be added to the instruction length to control execution timing. The processor determines the number of cycles, the number of which is random. For example, branch instructions may be executed in: 3 cycles+"3 bits number" which varies randomly from 3 cycles to 10 cycles, and skip instructions may be executed in: 4 cycles+"3 bits number" which varies from 4 cycles to 11 cycles.

Figure 8:
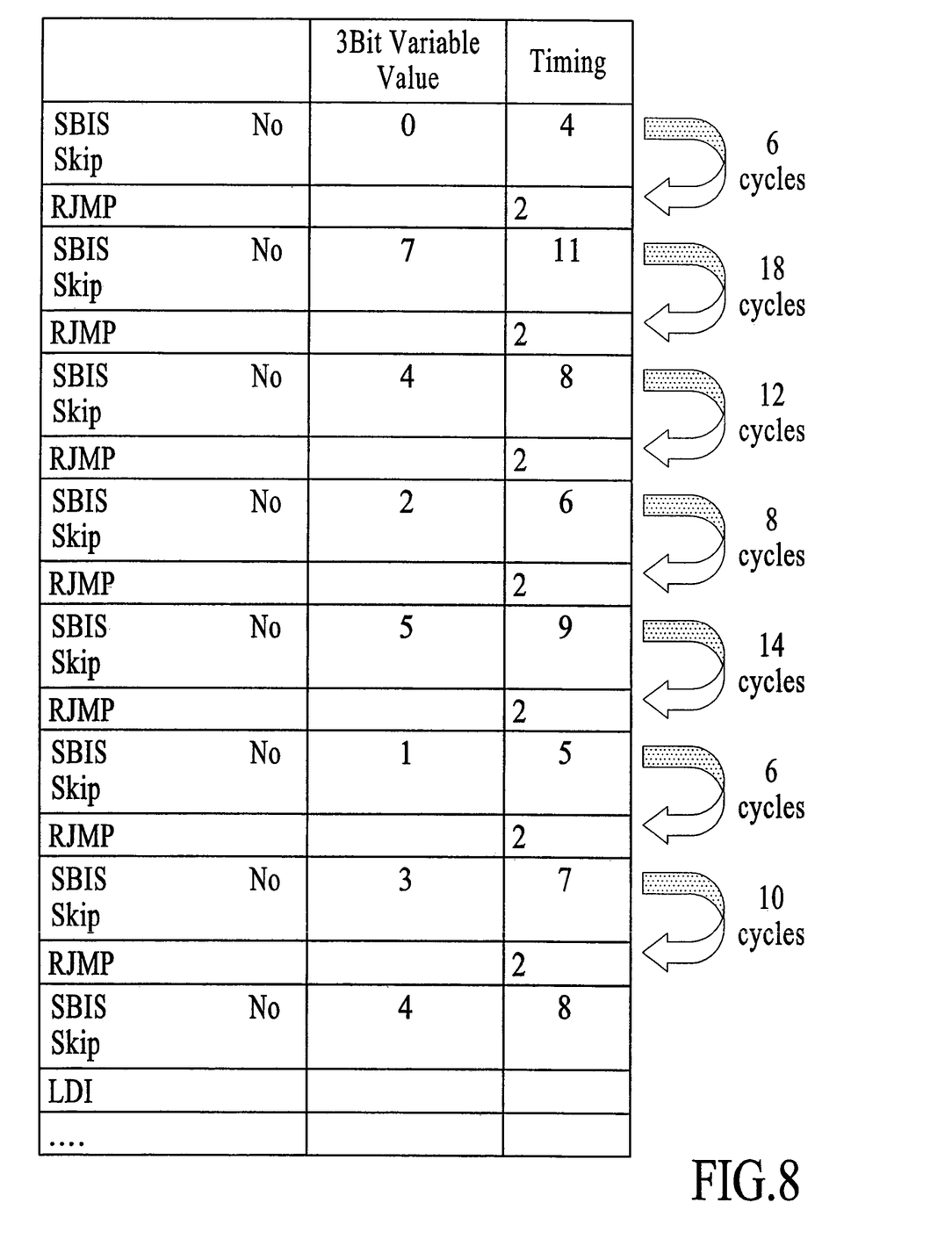
FIG. 8 is a timing diagram illustrating a CPU loop on a skip instruction in accordance with another embodiment of the present invention.

FIG. 8 is a timing diagram illustrating a CPU loop on a skip instruction in accordance with another embodiment of the present invention. In one implementation, the CPU loops such that the number of cycles taken to execute a skip instruction are random.

According to the system and method disclosed herein, the present invention provides numerous benefits. For example, it automatically balances and controls timing variations (e.g., caused by conditional branches), making processor functions high-level-language friendly. Embodiments of the present invention also control execution timing to avoid information leakage to simplify the implementation of security features. Embodiments of the present invention also enable the slowing down of processor instruction execution to improve power consumption, access slow peripherals, spread the electromagnetic spectrum, etc. Embodiments of the present invention also balance access time to different memories (e.g., random access memory (RAM), non-volatile memories).

A method and system in accordance with the present invention for controlling timing in a processor has been disclosed. The method includes controlling the execution times in which a CPU executes particular types of instructions in order to improve the overall security of the CPU. According to the system and method disclosed herein, the method effectively modifies the timing of a processor by controlling and/or minimizing variations in the execution times of instructions.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, a combination thereof. Software written according to the present invention is to be either stored in some form of computer-readable storage medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A method comprising:
fetching a plurality of instructions, wherein each instruction has a first default execution time during a first condition and a second default execution time during a second condition, wherein the first and second default execution times are unequal;

during a first mode, executing the plurality of instructions in a same selected execution time regardless of whether the first condition or the second condition is present, wherein the selected execution time is greater than each of the first and second default execution times; and during a second mode, executing the plurality of instructions within random execution times regardless of whether the first condition or the second condition is present.

2. The method of claim 1 wherein when the first condition is present, the second condition is not present, and when the second condition is present, the first condition is not present.

3. The method of claim 2 wherein the first default execution time is greater than the second default execution time.

4. The method of claim 1 further comprising:
executing at least one instruction of the plurality of instructions of a first type for an entire duration of a first execution time, wherein the first execution time is greater than the first default execution time; and
executing at least one instruction of the plurality of instructions of a second type for an entire duration of a second execution time, wherein the second execution time is greater than the second default execution time.

5. The method of claim 4 wherein the first and second execution times are the same.

6. The method of claim 4 wherein the first and second execution times are different.

7. The method of claim 4 wherein the first type of instruction is a branch instruction and the second type of instruction is a skip instruction.

8. The method of claim 4 wherein the first type of instruction is a skip instruction and the second type of instruction is a conditional branch instruction.

9. The method of claim 4 wherein the first execution time is equal to the first default execution time plus an added time, and wherein the added time is greater than zero.

10. The method of claim 9 wherein the first execution time is equal to three clock cycles and the first default execution time is equal to one of two clock cycles and one clock cycle.

11. The method of claim 4 wherein the second equal to the second execution time is default execution time plus an added time, and wherein the added time is greater than zero.

12. The method of claim 11 wherein the second execution time is equal to four clock cycles and the second default execution time is equal to one of three clock cycles, two clock cycles, and one clock cycle.

13. The method of claim 4 wherein the first execution time is based on a variable value.

14. The method of claim 13 wherein the variable value is random.

15. The method of claim 13 wherein the variable value controls the number of cycles taken by the processor to execute a given type of instruction.

16. The method of claim 15 wherein the variable value increases the number of cycles taken by the processor to execute a given type of instruction by at least one cycle.

17. A computer-readable storage medium containing program instructions for controlling timing in a processor, the program instructions which when executed by a computer system cause the computer system to execute a method, the method comprising:
fetching a plurality of instructions, wherein each instruction has a first default execution time during a first condition and a second default execution time during a second condition, wherein the first and second default execution times are unequal;

during a first mode, executing the plurality of instructions in a same selected execution time regardless of whether the first condition or the second condition is present, wherein the selected execution time is different from each of the first and second default execution times; and during a second mode, executing the plurality of instructions within random execution times regardless of whether the first condition or the second condition is present.

18. The computer-readable storage medium of claim 17 wherein when the first condition is present, the second condition is not present, and when the second condition is present, the first condition is not present.

19. The computer-readable storage medium of claim 17 further comprising program instructions for:

executing at least one instruction of the plurality of instructions of a first type for an entire duration of a first execution time, wherein the first execution time is greater than the first default execution time; and executing at least one instruction of the plurality of instructions of a second type for an entire duration of a second execution time, wherein the second execution time is greater than the second default execution time.

20. The computer-readable storage medium of claim 19 wherein the first and second execution times are the same.

21. The computer-readable storage medium of claim 19 wherein the first and second execution times are different.

22. The computer-readable storage medium of claim 19 wherein the first type of instruction is a branch instruction and the second type of instruction is a skip instruction.

23. The computer-readable storage medium of claim 19 wherein the first type of instruction is a skip instruction and the second type of instruction is a conditional branch instruction.

24. The computer-readable storage medium of claim 19 wherein the first execution time is equal to the first default execution time plus an added time, and wherein the added time is greater than zero.

25. The computer-readable storage medium of claim 24 wherein the first execution time is equal to three clock cycles and the first default execution time is equal to one of two clock cycles and one clock cycle.

26. The computer-readable storage medium of claim 19 wherein the second execution time equal to the second default execution time plus an added time, and wherein the added time is greater than zero.

27. The computer-readable storage medium of claim 26 wherein the second execution time is equal to four clock cycles and the second default execution time is equal to one of three clock cycles, two clock cycles, and one clock cycle.

28. The computer-readable storage medium of claim 19 wherein the first execution time is based on a variable value.

29. The computer-readable storage medium of claim 28 wherein the variable value is random.

30. The computer-readable storage medium of claim 28 wherein the variable value controls the number of cycles taken by the processor to execute a given type of instruction.

31. The computer-readable storage medium of claim 30 wherein the variable value increases the number of cycles taken by the processor to execute a given type of instruction by at least one cycle.

32. A system comprising:

a processor for fetching a plurality of instructions, wherein each instruction has a first default execution time during a first condition and a second default execution time during a second condition, wherein the first and second default execution times are unequal; and at least one hardware register for enabling timing compensation, wherein during a first mode, the processor executes the plurality of instructions in a same selected execution time regardless of whether the first condition or the second condition is present, wherein the selected execution time is different from each of the first and second default execution times, and wherein during a second mode, the processor executes the plurality of instructions within random execution times regardless of whether the first condition or the second condition is present.

33. The system of claim 32 wherein, during the first mode, the processor executes at least one instruction of the plurality of instructions of a first type for an entire duration of a first execution time, wherein the first execution time is greater than the first default execution time, and wherein the processor executes at least one instruction of the plurality of instructions of a second type for an entire duration of a second execution time, wherein the second execution time is greater than the second default execution time.

34. The system of claim 33 wherein the first and second execution times are the same.

35. The system of claim 33 wherein the first and second execution times are different.

36. The system of claim 33 wherein the first execution time is based on a variable value.

37. The system of claim 36 wherein the variable value is random.

38. The system of claim 33 wherein the variable value controls the number of cycles taken by the processor to execute a given type of instruction.

39. A method comprising:

fetching a plurality of instructions, wherein each instruction of the plurality of instructions has a first default execution time and second default execution time unequal to the first default execution time;

executing the plurality of instructions using a same selected execution time for each instruction of the plurality of instructions if a first mode is enabled, wherein the selected execution time is different from each of the first and second default execution times; and executing the plurality of instructions using a random execution time for at least one instruction of the plurality of instructions if a second mode is enabled.

40. The method of claim 39 further comprising:

executing the plurality of instructions using one of the first and second default execution times if none of the first and second modes are enabled.

41. The method of claim 39 further comprising:

setting a first bit and setting a second bit to enable one of the first mode and the second mode.

42. The method of claim 39 further comprising:

setting only a single bit to enable the first mode.

43. The method of claim 39, wherein the random execution time used to execute one of the plurality of instructions includes at least two consecutive clock cycles.

* * * * *

UNITED STATES PATENT AND TRADEMARK OFFICE
CERTIFICATE OF CORRECTION

| | | |
|---|---|---|
| PATENT NO. | : 7,647,486 B2 | Page 1 of 1 |
| APPLICATION NO. | : 11/416651 | |
| DATED | : January 12, 2010 | |
| INVENTOR(S) | : Majid Kaabouch et al. | |

It is certified that error appears in the above-identified patent and that said Letters Patent is hereby corrected as shown below:

Title Page, Item [*] Notice:

The phrase "by 44 days" shall reflect as such appears on Letters Patent.

In column 5, line 53, after "instructions," insert -- or --.

In column 6, lines 42-43, in Claim 11, delete "equal to the second execution time is" and insert -- execution time is equal to the second --, therefor.

In column 7, line 46, in Claim 26, after "time" insert -- is --.

Signed and Sealed this

Ninth Day of November, 2010

David J. Kappos
*Director of the United States Patent and Trademark Office*